United States Patent [19]
Glass et al.

[11] 4,428,644
[45] Jan. 31, 1984

[54] ALIGNMENT OF OPTICAL COMPONENTS

[75] Inventors: Alastair M. Glass, Rumson; Ivan P. Kaminow, Tinton Falls; Donald H. Olson, Colts Neck, all of N.J.

[73] Assignee: Bell Telephone Laboratories, Incorporated, Murray Hill, N.J.

[21] Appl. No.: 304,204

[22] Filed: Sep. 21, 1981

Related U.S. Application Data

[62] Division of Ser. No. 108,950, Dec. 31, 1979, Pat. No. 4,334,774.

[51] Int. Cl.³ ............................................. G02B 5/172
[52] U.S. Cl. .................................................... 350/96.14
[58] Field of Search ............... 350/96.12, 96.13, 96.14; 356/44, 152

[56] References Cited

U.S. PATENT DOCUMENTS

| | | | |
|---|---|---|---|
| 4,147,979 | 4/1979 | Baues et al. | 350/96.13 X |
| 4,196,964 | 4/1980 | Papuchon | 350/96.14 |
| 4,198,115 | 4/1980 | Kaminow | 350/96.14 |

OTHER PUBLICATIONS

*Applied Physics Letters*, vol. 24, No. 2, Jan. 15, 1974, pp. 81–82, Glass et al., "Optical Gating and Logic with Pyroelectric Crystals".
*Applied Physics Letters*, 35 (1), Jul. 1, 1979, pp. 40–42, Minakata, Efficient LiNbO₃ Balanced Bridge . . . ".
*Review of the Electrical Communication Laboratories*, vol 26, No. 9–10, Sep.–Oct. 1978, pp. 1139–1151, Minakata et al., "Temperature Stabilized Optical Waveguide Modulation".

*Primary Examiner*—John D. Lee
*Assistant Examiner*—Frank González
*Attorney, Agent, or Firm*—Bruce S. Schneider; Bernard Tiegerman

[57] ABSTRACT

A means for aligning components of an optical system without the use of conventional optical equipment is disclosed. This means includes the use of a pair of electrodes in proximity with the light guiding portion of a pyroelectric system element. The absorption of light in the waveguide produces a current in the pyroelectric material tht is monitored at the electrodes. Alignment of the system components is achieved by adjusting their relative position to increase the monitored signal.

4 Claims, 6 Drawing Figures

ALIGNMENT OF OPTICAL COMPONENTS

This is a division of application Ser. No. 108,950, filed Dec. 31, 1979, now U.S. Pat. No. 4,334,774.

BACKGROUND OF THE INVENTION

1. Field of the Invention

This invention relates to light waveguides and, more particularly, to optical circuits.

2. Art Background

Optical waveguide systems are composed of a variety of constituent parts. Thse constituent parts include a source of light, optical waveguides, e.g., optical fibers, to carry the light produced, and a component to perform signal processing operations such as to switch signals among the optical waveguides of the system. The last component is typically fabricated from a pyroelectric material such as lithium niobate or lithium tantalate. Wavepaths generally are fabricated in the pyroelectric substrate by depositing a dopant such as titanium on the surface of the substrate in the pattern desired for the wavepaths. The substrate is then heated to diffuse the dopant into the substrate. This procedure forms a wavepath, i.e., a section in the pyroelectric material that guides light, usually about 1 to 5 $\mu$m deep and 1 to 10 $\mu$m wide. To cause signal processing, such as switching between wavepaths in the pyroelectric material, a voltage is imposed across the region of the crystal where the processing is desired through electrodes deposited for this purpose. This voltage produces local changes in the optical polarizability of the crystal, thus locally changing the refractive index and, in turn, effecting the processing, e.g., altering the path of light through the crystal.

Due to the relatively small cross-section of the waveguides, the alignment of the various components, such as the alignment of optical fibers with the wavepaths of the processing element, is not a trivial problem. Typically, this alignment is done with a lens and photodetector system. For example, a component with a light output, e.g., an optical fiber, is coarsely aligned with a wavepath in a switching element, and the lens system is positioned to direct the light exiting from the wavepath onto the photodetector. The component with electromagnetic radiation output is then adjusted to maximize the electromagnetic radiation exiting the wavepath as observed by the photodector. After alignment, the lens system and detector must be repositioned for the next alignment procedure. Although positioning the lens/detector system is not as difficult as the actual alignment itself, it is time-consuming and significantly increases costs. Additionally, a lens system and photodector are not easily adapted to use outside a laboratory environment. This limits assembly and repair of optical communication systems in places such as a cable vault.

SUMMARY OF THE INVENTION

The alignment of components having a light output, such as optical fibers, with the processing element, in a pyroelectric medium, is achievable without the use of a lens system and a conventional light-detecting means. The alignment is accomplished by using a set of electrodes incorporated in the processing element. This set of electrodes contacts the body of the processing element, e.g., the body of the lithium niobate or lithium tantalate crystal, in proximity to the wavepath to which alignment is being made. When modulated electromagnetic radiation traverses the wavepath, it induces an electrical current in the electrodes through the pyroelectric effect. By monitoring this electrical current, the accuracy of the alignment is easily measured and accurate alignment is achieved by positioning the components being aligned to increase, preferably maximize, the resulting signal. The same electrodes used for processing signals are also useable for alignment by the subject invention.

DETAILED DESCRIPTION

Figure 1:
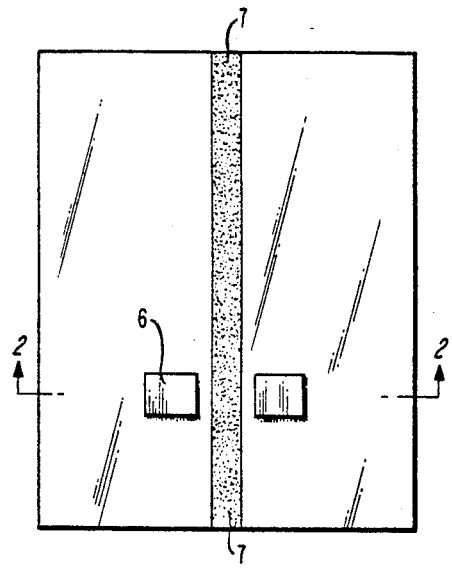
FIGS. 1-5 illustrate embodiments of electrode configurations useful in the subject invention.
Figure 3:
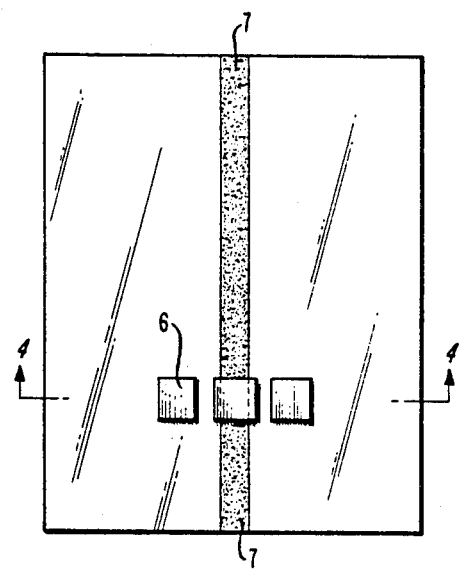
Figure 2:
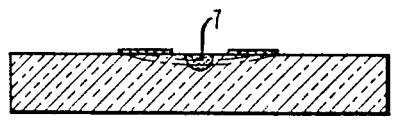
Figure 4:

The subject invention utilizes the inherent properties of pyroelectric materials. These pyroelectric materials are used in the processing components of optical systems. Electromagnetic radiation absorbed in the pyroelectric material induces a temperature change corresponding to the extent of absorption. The temperature change, in turn, produces a concomitant change in dielectric polarization which is observable as a time-dependent charge, i.e., a current in the electrodes. When the electromagnetic radiation is modulated, the resulting modulation in polarization is detectable as a similarly modulated current between suitably positioned electrodes. The geometry used for the electrodes is to an extent dependent on the direction of spontaneous polarization of the pyroelectric material used in the switching element. The basic criterion is that the electrodes be positioned so that electric field lines produced by a change in the polarization vector intersect the electrodes as indicated in FIGS. 2 and 4. The change in the polarization vector is pyroelectrically induced, for example, by absorption of light in the wavepath. Plan and cross-sectional representations of advantageous configurations are shown in FIGS. 1 and 2 for pyroelectric crystals having the direction of spontaneous polarization in the plane of the wavepath and in FIGS. 3 and 4 for pyroelectric crystals having the direction of spontaneous polarization perpendicular to the plane of the wavepath. The dot-dash lines indicate those electric field lines that intersect the electrodes and the stippled area, 7, denotes the wavepath. (The electrode directly above the wavepath in FIGS. 3 and 4 rests on a buffer layer of a dielectric material, e.g., $SiO_2$ to prevent excessive absorption of light directly in the electrode.)

Figure 5:
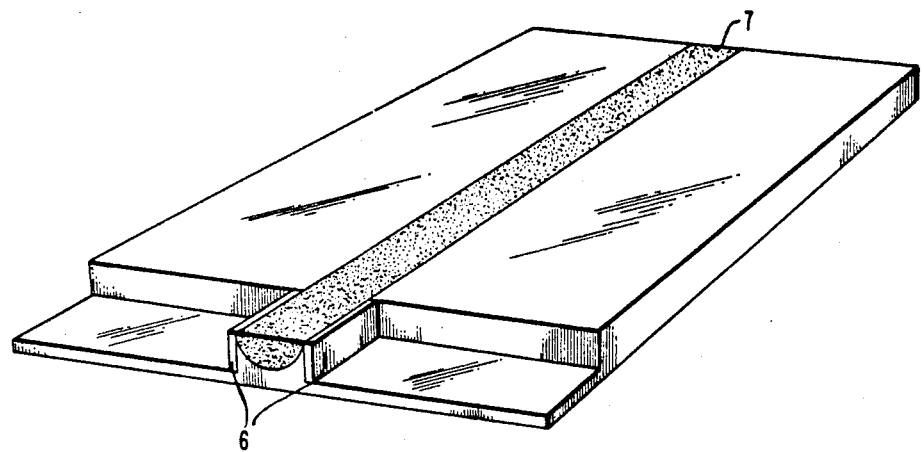

The exact positioning of the electrodes on the pyroelectric substrate is not critical. However, the electrodes must not be shorted together. That is, the extent of the material between the electrodes, e.g., air and/or they pyroelectric material, must have sufficient resistance to limit the leakage between the electrodes to less than 50 percent, preferably less than 5 percent, of the total monitored current. Additionally, the electrodes must be positioned to be in close proximity to the wavepath of the pyroelectric crystal to be aligned. This is achieved, for example, as shown in FIGS. 1 and 3 by depositing the electrodes, 6, on the surface of the pyroelectric crystal in the proximity of the desired wavepath, 7. Alternatively, it is possible to remove part of the crystal during processing such as by conventional etching techniques and position the electrode, 6, in FIG. 5 on either side of the wavepath, 7. Generally, the electrode should be within 100 $\mu$m, preferably within 3

μm, of the wavepath with which alignment is desired. (As discussed later, it is acceptable to have the electrodes overlapping the wavepath.)

The size and composition of the electrodes are generally not critical. However, to insure the detection of the largest possible signals, certain limitations are advantageous. The material used as the electrode should have a sheet resistance less than $10^3$ ohm/□ to ensure advantageous collection of current. For example, metals such as gold, silver or aluminum are used. The metal is deposited on the substrate using conventional techniques such as evaporation. The area upon which the electrodes are deposited is defined by conventional techniques such as photolithography. The techniques chosen should be restricted to conditions which do not unacceptably affect the wavepath. For example, temperature should be employed that do not cause the dopant forming the wavepath to undergo further diffusion.

The thickness of the electrodes typically should be in the range 200 Angstroms to 2000 Angstroms. Electrodes thinner than 200 Angstroms have high resistivity and unduly attenuate the signal. Electrodes thicker than 2000 Angstroms are difficult to fabricate and have a tendency to separate from the pyroelectric substrate. Advantageously the thickness of the electrode should be in the range 300 to 1500 Angstroms.

Figure 6:
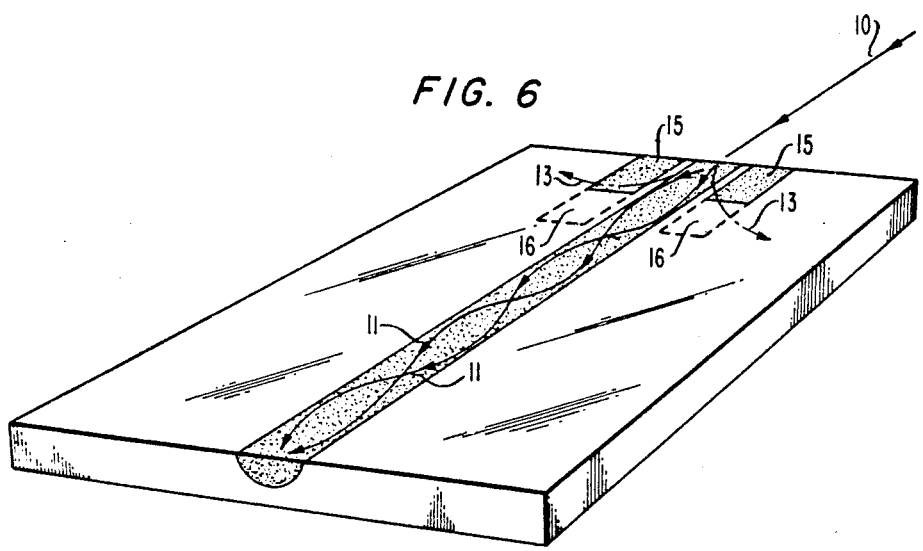
FIG. 6 illustrates in appropriate relationship between the detecting electrodes and the wavepath.

Since the surface of the pyroelectric material contains electrodes utilized for signal processing, it is generally desirable to limit the length, i.e., the dimension in the direction of the waveguide, of the detecting electrode so that the surface area available for the electrodes that control the processing function is not unnecessarily restricted. Within the strictures imposed by the necessity for positioning of the processing electrodes, the length of the detecting electrodes, to an extent, depends on their proximity to the extremities of the substrate. If the electrode is at the edge of the substrate where electromagnetic radiation is to be introduced as shown in FIG. 6, the length of these detecting electrodes should be sufficiently large so that discrimination between guided electromagnetic radiation and scattered electromagnetic radiation, i.e., non-guided electromagnetic radiation, is satisfactory. As shown by vectors, 13 and 11 in FIG. 6 when electromagnetic radiation, 10, is incident on the substrate before alignment is performed, a light portion, 11, is guided in the waveguide and a significant portion, 13, dependent on the extent of misalignment, scatters from the waveguide. If the electrode length is too short (as shown by stippled electrodes 15), the non-guided light, scattered from the waveguide and absorbed in the volume between the electrodes, is still detected by the electrodes and produces a substantial component of the resulting signal. Thus, a spurious indication of alignment is observed. The shorter the electrodes, the worse the problem becomes. For typical conditions, electrodes positioned at the edge of the substrate where insertion is to occur should have longer lengths (as shown by the combined dotted and stippled electrode area, 16, exaggerated for clarity), i.e., greater than 50 μm. If the electrodes are removed at least 1 mm from the extremity of the substrate where electromagnetic radiation insertion occurs, such limitations on length generally are not necessary.

The width of the detecting electrodes is typically in the range 10 μm to 1000 μm, preferably 50 μm to 200 μm. Narrower electrodes have excessive sheet resistance and usually produce an undesirable signal attenuation. Wider electrodes are generally unsuitable because it is possible that a substantial amount of scattered light is absorbed directly in the electrodes producing a spurious signal. Contact to the electrodes is made by conventional techniques such as through the use of silver paste.

In addition to the factors discussed above, the intensity of the detected signal depends on the extent of absorption of the electromagnetic radiation in the pyroelectric substrate. To cause a change in polarization, a corresponding change in the absorption of electromagnetic radiation is necessary. However, the optical signal intensity in the waveguide system is diminished through absorption of electromagnetic radiation. Thus, it is generally desirable to limit this absorption to less than 10 percent of the electromagnetic radiation incident on the switching element so that the optical signal is not unacceptably attenuated. Within this 10 percent limitation, the greater the absorption, the greater the detected current, and the easier the alignment process. It is possible to increase the attenuation in the area of the wavepath in order to produce this result. For example, it is possible to introduce electromagnetic radiation absorbing dopants such as copper into the wavepath directly adjacent to the detecting electrodes within the waveguide region. This is done by adding copper in the desired region to the dopant used for guiding, e.g., titanium, and then annealing. This dopant produces greater absorption in the near infrared and visible region (typical regions used in optical systems) and thus increases the signal to be detected for purposes of alignment.

Alternatively, it is possible to deposit the electrodes so that they overlap the wavepath. The metal from the electrodes absorbs electromagnetic radiation in the wavepath directly producing a temperature change in the adjacent wavepath which increases the detection signal. This absorption as previously discussed should be limited to 10 percent by, for example, limiting the amount of dopant used, by limiting the extent of electrode overlap, or by inserting a dielectric between the overlapping portion of the electrode and the wavepath sufficient to decrease the amount of absorption in the electrode. Thus in one embodiment of the invention, the signal processing means is modified to enhance electromagnetic radiation absorption and thus increase the signal detected. Again, however, it should be remembered that such electromagnetic radiation attenuation generally should be limited to 10 percent of the incident signal.

For some applications even additional losses as small as 10 percent are not tolerable. In such circumstances, various expedients are employable to limit this excess loss while allowing alignment. It is possible to use the electrodes present for the processing function as the electrodes used for alignment provided they satisfy the discussed criteria. Additionally, dopants which absorb light selectively at wavelengths removed from the operating wavelength are introduced into the wavepath. In the latter embodiment, electromagnetic radiation in the absorbing region of this added dopant is used to achieve alignment.

As discussed previously, the inserted electromagnetic radiation is advantageously modulated in order to produce a continuously changing polarization in the pyroelectric substrate and a corresponding production of an AC current at the detecting electrodes. Generally this modulation should be in the frequency range between 10 Hz and 1 MHz, preferably in the range 1 kHz to 1 MHz. Signals with frequenices less than 10 Hz produce excessive thermal diffusion loss and thus yield an unacceptably low signal. Higher frequencies produce an excessively high AC attenuation due to circuit capacitance effects, with a corresponding loss of signal and degradation of the signal-to-noise ratio. The modulation of the electromagnetic radiation source is produced by conventional techniques such as current modulation of a diode laser source.

To increase the signal-to-noise ratio of the alignment signal, a phase-detecting device is desirable. For example, a lock-in amplifier is utilized to monitor the signal in phase with the modulation of the electromagnetic radiation source. Alignment is possible without this requirement, but this tends to degrade the signal-to-noise ratio.

The following example is illustrative of the invention:

EXAMPLE

A polished lithium niobate crystal having its z-axis in the plane of the plate and having its x-axis perpendicular to the plane of the plate was cleaved along the (01.2) plane. The resulting cleaved crystal was approximately 2½ cm long, 6 mm wide, and ½ mm thick.

Wavepaths were fabricated in the lithium niobate crystal by first depositing a 4 $\mu$m wide, 300 Angstrom thick strip of titanium metal onto the surface of the crystal. The titanium deposition was accomplished by using a conventional thermal evaporation apparatus in conjunction with the use of conventional photolithographic techniques. An approximately 1 $\mu$m thick layer of positive resist (Shippley AZ1350J) was spun onto the surface of the lithium niobate crystal and a pattern corresponding to the desired wavepath (4 $\mu$m width) along the length of the crystal was delineated approximately in the center of the crystal, and approximately perpendicular to the cleaved edges of the crystal. (A second area identical to and parallel with the first was delineated for purpose of registering the electrode mask in a subsequent processing step.) This delineating exposure was accomplished using a mercury light source and an iron oxide mask. The exposed area of the resist was then removed using a Shippley AZ developer.

A 300 Angstrom thick layer of titanium was evaporated onto the delineated crystal using a thermal evaporation apparatus. The wavepath in the center of the crystal was masked and an additional 1000 Angstroms of titanium was deposited, thus increasing the thickness of the titanium registration guide. The photoresist was then lifted off using acetone. This procedure yielded a layer of titanium in the wavepath on the surface of the crystal measuring 4 $\mu$m wide and having a thickness of approximately 300 Angstroms. The crystal was then inserted into an oven having an argon atmosphere. The oven was heated to 980 degrees C. and the crystal was treated at this temperature for 4 hours. The average depth of the resulting wavepath was approximately 2 $\mu$m.

A photoresist was again deposited on the crystal surface and using the same photolithographic technique described above an area on the crystal was delineated for deposition of the electrodes. This area included two regions, 20 $\mu$m in width, that ran the length of the crystal, were parallel to the wavepath, were equally spaced on opposite sides of the wavepath, and were spaced approximately 9 $\mu$m apart. (The delineated areas for the electrodes were registered relative to the readily visible registration guide produced during the previous processing step. As described previously, the excessive length of these electrodes under some circumstances might interfere with processing electrodes. However, they were made this length for experimental convenience in demonstrating the subject procees). The electrodes were then formed by evaporating a 100 Angstrom thick layer of Cr and a 1000 Angstrom layer of Al onto the crystal. The photoresist was then removed as previously described.

The electrodes were contacted by using silver paste to attach a Au wire to each electrode. The leads were connected to a lock-in amplifier. (The connection introduced a 100 pfarad capacitance into the system.) A helium neon laser was used as a source of electromagnetic radiation. The output of this laser (100 microwatts intensity) was focused in the area of the wavepath on the cleaved face of the crystal by appropriately positioning a microscope objective (20×magnification) which was placed in the path of the laser beam. The laser beam was modulated with a mechanical chopper at 1 kHz. The current output at the electrodes was monitored by the lock-in amplifier. Initially, the measured current was essentially zero. The crystal was then translated using an x-y-z table which was equipped with micrometer adjustments. The crystal was initially translated so that the light beam was focused on the cleaved face of the crystal with the focused laser beam being approximately at the position of the wavepath. Then x, y, and z adjustments were sequentially made until a maximum current (in this case 4 pAmps) was observed.

What is claimed is:

1. An apparatus comprising:
(1) a pyroelectric material having a wavepath which guides electromagnetic radiation, (2) electrodes in intimate contact with said pyroelectric material and in proximity to said wavepath, each of said electrodes having a sheet resistance less than $10^3$ ohm/□, a thickness ranging from about 200 Angstroms to about 2000 Angstroms, and a width ranging from about 10 $\mu$m to about 1000 $\mu$m, and (3) a means for increasing the absorption of said electromagnetic radiation incident on said wavepath relative to the electromagnetic radiation absorbed in the absence of said means for increasing absorption, whereby a portion of any modulated electromagnetic radiation incident on said wavepath is absorbed by said pyroelectric material, the absorption of said portion inducing an electrical current in said electrodes.

2. The apparatus of claim 1 wherein said means for increasing absorption is the placement of said electrodes in contact with said wavepath.

3. The apparatus of claim 1 wherein said means for increasing absorption comprises the presence of a dopant in said wavepath which absorbs said electromagnetic radiation in addition to a waveguide producing dopant in said wavepath.

4. The apparatus of claim 3 including a means for monitoring a current produced at said electrodes.

* * * * *

UNITED STATES PATENT AND TRADEMARK OFFICE
CERTIFICATE OF CORRECTION

PATENT NO. : 4,428,644

DATED : January 31, 1984

INVENTOR(S) : Alastair M. Glass, Ivan P. Kaminow, and Donald H. Olson

It is certified that error appears in the above-identified patent and that said Letters Patent is hereby corrected as shown below:

In the Abstract, line 7, "tht" should read --that--. Column 2, line 55, "they" should read --the--. Column 5, line 36, "purpose" should read --purposes--. Column 6, line 7, "procees" should read --process--.

Signed and Sealed this

Twenty-fourth Day of July 1984

[SEAL]

Attest:

GERALD J. MOSSINGHOFF

Attesting Officer  Commissioner of Patents and Trademarks